(12) United States Patent
Shen et al.

(10) Patent No.: US 7,509,215 B2
(45) Date of Patent: Mar. 24, 2009

(54) AUGMENTED NAVIGATION SYSTEM

(75) Inventors: Guo Bin Shen, Beijing (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 350 days.

(21) Appl. No.: 11/301,334

(22) Filed: Dec. 12, 2005

(65) Prior Publication Data

US 2007/0150175 A1    Jun. 28, 2007

(51) Int. Cl.
*G01C 21/34*    (2006.01)

(52) U.S. Cl. ............ 701/211; 701/201; 340/995.24

(58) Field of Classification Search .......... None
See application file for complete search history.

(56) References Cited

U.S. PATENT DOCUMENTS

| | | | |
|---|---|---|---|
| 4,474,501 A * | 10/1984 | LaRussa | 434/43 |
| 5,559,707 A * | 9/1996 | DeLorme et al. | 701/200 |
| 5,577,981 A * | 11/1996 | Jarvik | 482/4 |
| 6,023,241 A * | 2/2000 | Clapper | 342/357.13 |
| 6,182,010 B1 * | 1/2001 | Berstis | 701/211 |
| 6,199,014 B1 * | 3/2001 | Walker et al. | 701/211 |
| 6,282,362 B1 * | 8/2001 | Murphy et al. | 386/46 |
| 6,351,710 B1 * | 2/2002 | Mays | 701/211 |
| 6,622,087 B2 * | 9/2003 | Anderson | 701/209 |
| 6,725,154 B2 * | 4/2004 | Kamikawa et al. | 701/208 |
| 6,903,763 B1 * | 6/2005 | Noguchi et al. | 348/207.99 |
| 7,155,338 B2 * | 12/2006 | Kauvo et al. | 701/209 |
| 7,289,904 B2 * | 10/2007 | Uyeki | 701/209 |
| 2002/0047895 A1 * | 4/2002 | Bernardo et al. | 348/48 |
| 2003/0164822 A1 * | 9/2003 | Okada | 345/204 |
| 2004/0172192 A1 * | 9/2004 | Knutson | 701/208 |
| 2004/0210382 A1 * | 10/2004 | Itabashi | 701/202 |
| 2004/0249565 A1 * | 12/2004 | Park | 701/200 |
| 2006/0004512 A1 * | 1/2006 | Herbst et al. | 701/208 |

FOREIGN PATENT DOCUMENTS

WO    WO-02/063243 A1 *    8/2002

* cited by examiner

*Primary Examiner*—Michael J. Zanelli
(74) *Attorney, Agent, or Firm*—Perkins Coie LLP

(57) ABSTRACT

A method and system for providing augmented directions that include actual media collected from locations along the route and annotations is provided. An augmented navigation system includes a collection component, a direction component, and a playback component. The collection component may be used to collect actual media from various locations and augment a map with the actual media. The direction component generates augmented directions as requested by a user based on the augmented map. The playback component may output the directions in real time as the user navigates.

13 Claims, 10 Drawing Sheets

AUGMENTED NAVIGATION SYSTEM

BACKGROUND

Current mapping and navigation systems mimic traditional navigation by using a paper map metaphor. Some mapping systems allow a user to input a start location and an end location and then generate directions on how to navigate from the start location to the end location. The directions may include a map and verbal instructions. The map is provided in a traditional map format, and the verbal or word instructions describe how to proceed from the start location to the end location. An example verbal instruction is "Turn right on First Street" or "Proceed 10.1 miles on Route 66." The mapping system then displays the directions to the user. The user may then print the directions and use the printed map and verbal instructions to navigate from the start location to the end location.

Some navigation systems use global positioning system ("GPS") technology and electronic maps ("E-map") technology to enhance the navigation experience in terms of both coverage and functionality. Such navigation systems that include a GPS component and an E-map component can provide navigation guidance with a recommended route highlighted on the E-map and audio output of the verbal instructions. For example, an automobile equipped with such a navigation system may display the current location of the automobile on the displayed map and provide the verbal instructions through a speaker system. An example verbal instruction is "Exit to the right in 0.2 miles." If the driver deviates from the directions (e.g., misses a turn) as indicated by the GPS, the navigation system may automatically adjust the directions to compensate for the deviation. Rather than using GPS technology, some navigation systems may use cellular technology to determine the current location. For example, a cellular phone may include a navigation system that triangulates the current location based on the position of the cellular phone relative to cell towers.

The directions provided by the current navigation and mapping systems, however, are generally simply electronic versions of the paper map metaphor enhanced with verbal instructions and current location. Because of this limitation, the systems do not provide directions in the same way that people would normally provide directions orally. For example, verbal instructions with the paper map metaphor may be "Proceed 0.2 miles and turn right," whereas the instructions provided by a person may be "turn right at the library." As a result, the current navigation and mapping systems provide directions that are not particularly intuitive to a person.

SUMMARY

A method and system for providing augmented directions that include actual media collected from locations along the route and annotations is provided. An augmented navigation system includes a collection component, a direction component, a query component, and a playback component. The collection component may be used to collect actual media from various locations and augment a map with the actual media. The direction component generates augmented directions as requested by the query component based on the augmented map. The direction component may receive a query for directions that include a start location and an end location and generates augmented directions from the augmented map for navigating from the start location to the end location. The query component receives queries for directions from a user and requests the direction component to generate the directions. The playback component outputs the augmented directions to a user. The playback component may output the directions in real time as the user navigates.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
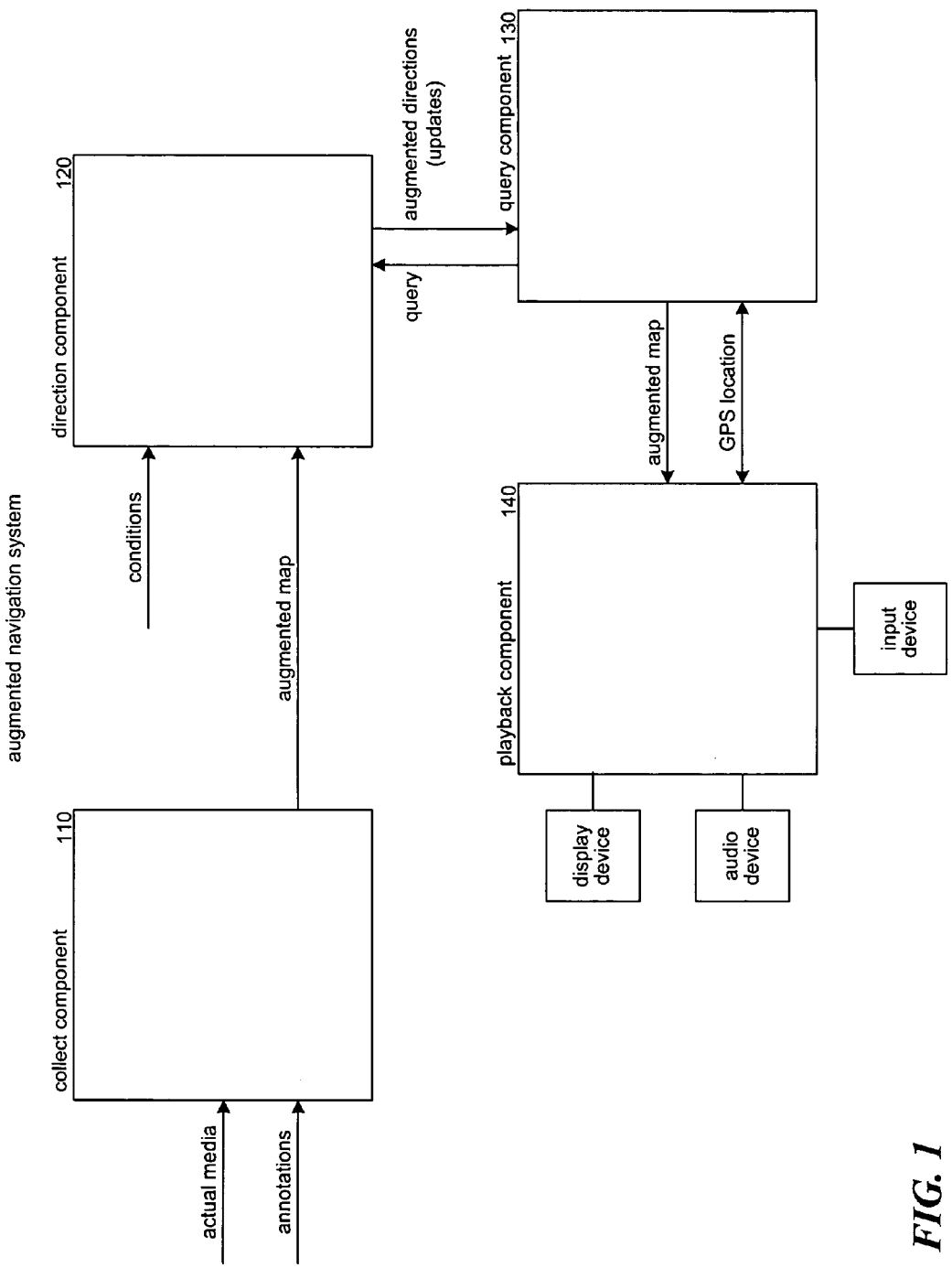
FIG. 1 is a block diagram that illustrates components of the augmented navigation system in one embodiment.

A method and system for providing augmented directions that include actual media collected from locations along the route and annotations is provided. In one embodiment, an augmented navigation system includes a collection component, a direction component, a query component, and a playback component. The collection component may be used to collect actual media from various locations. For example, the actual media may be photographs taken at various locations along a route or a video taken along the route. The collection component can be used to correlate the actual media with map locations. For example, the collection component may associate a photograph of a library that is taken from a certain location with the block of a street that has the same location. The collection system may perform this correlation automatically or with user assistance. The collection system may also allow a user to annotate various map locations. For example, a user may add an annotation such as "You'll see the library on your right." The annotations may be provided from the user in a text or oral format. The collection system may create an augmented map store that contains an electronic map, information for creating conventional verbal instructions, and the collected actual media and annotations for use in generating augmented directions. The collection system can then provide the augmented map to the direction component.

The direction component generates augmented directions as requested by a user based on the augmented map. The direction component may receive a query for directions that include a start location and an end location. For example, the direction component may generate conventional directions comprising an electronic map and verbal instructions. The direction component may then augment the directions with the media and annotations associated with the map locations. For example, a certain intersection may have associated with it an image of a library and the annotation "You'll see the library on your right." The direction component may also adapt the augmented directions based on user preferences, current conditions, playback device constraints, and so on. For example, a user preference may be to not travel on toll roads, a current condition may be traffic congestion, and a playback device constraint may be that no display is available. The direction component may also dynamically update augmented directions based on changes in the current condition. For example, if a road becomes congested, the direction component may update the augmented directions to avoid the congestion. The direction component may also allow a user to locate their current position based on actual media collected from that position. For example, a user may be unsure of their current location and take a picture of a landmark, such as the library. The direction component can compare the picture and identify that the picture corresponds to the library. For example, the direction component may compare the received picture to images and videos collected by the collection system. The direction component can then provide the augmented directions to the playback component.

The query component may receive queries for directions from users, provide the queries to the direction component, receive augmented directions from the direction component, and provide the augmented directions to the playback component. The query component may receive the start and end locations for the directions from the user. Alternatively, the query component may input the start location from a GPS device. For example, if the query component is part of a mobile device, then a user traveling with the mobile device can submit a query to the query component for directions from the current location to an end location.

The playback component outputs the augmented directions to a user. The playback component may output the directions in real time as the user navigates. For example, if the playback component is part of a desktop computer, then the user may request the playback component to print out the augmented directions. The user can use the printout to navigate from the start location to the end location. If the playback component is part of a mobile device (e.g., cellular phone, mobile computer, or special navigation device), then the playback component can output the directions in real time. The playback component updates the output of the directions based on the automatically determined current location (e.g., using a GPS) or based on user input (e.g., pointing to a current location). The playback component may automatically display the actual media and annotations based on the current location. For example, the playback component may display a video associated with the block on which the user is currently driving. The video will help the user determine whether the user is proceeding in accordance with the directions. The playback component may also display images associated with the current location. For example, the playback component may display an image of the library as the user navigates by the library. Also, the playback component may output the audio "You'll see the library on the right" at the same time.

The playback component can also receive updates to the directions from the direction component as the conditions change.

FIG. 1 is a block diagram that illustrates components of the augmented navigation system in one embodiment. The augmented navigation system includes a collection component 110, a direction component 120, a query component 130, and a playback component 140. The collection component collects actual media and annotations and augments an electronic map with the actual media and annotations. The direction component receives the augmented map from the collection component and receives user queries for directions from the query component and generates augmented directions that are provided to the query component. The direction component may also receive various conditions that may impact the directions that are generated. The query component provides user queries for directions to the direction component and receives augmented directions. The query component may receive the current location from a GPS device. The query component provides the augmented directions to the playback component and may provide updated augmented directions based on the current location. The playback component may be implemented on the same device as the query component or may be implemented on a separate device. For example the query component may be implemented on a desktop computer, and the playback component may be implemented on a mobile device such as an MP3 player. The playback component receives the augmented directions from the query component and outputs the augmented directions to a display device and/or audio device. The playback component may update the output of the augmented directions based on current location or based on user input received via the input device.

In one embodiment, when the augmented directions include a video, the playback component may adjust the playback rate to the speed at which the user is traveling. The playback component may determine the travel speed in various ways such as from a GPS device, a speedometer of an automobile, a cell phone triangulation, and so on. Each video or portion of a video may have an associated capture speed indicating the speed of the capture device at the time of capture. The playback component adjusts the playback rate to compensate for differences between the travel speed and capture speed.

The computing devices on which the augmented navigation system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the augmented navigation system. In addition, the data structures and message structures may be stored or transmitted via a data transmission medium, such as a signal on a communications link. Various communications links may be used, such as the Internet, a local area network, a wide area network, or a point-to-point dial-up connection.

The augmented navigation system may be used in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. The augmented navigation system may also be used on computing devices such as cell phones, personal digital assistants, consumer electronics, home automation devices, and so on. The components may be implemented on different computing devices. For example, the collection component may be implemented on a backend system, the direction component may be implemented on a server, and the query and playback components may be implemented on mobile devices.

The augmented navigation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
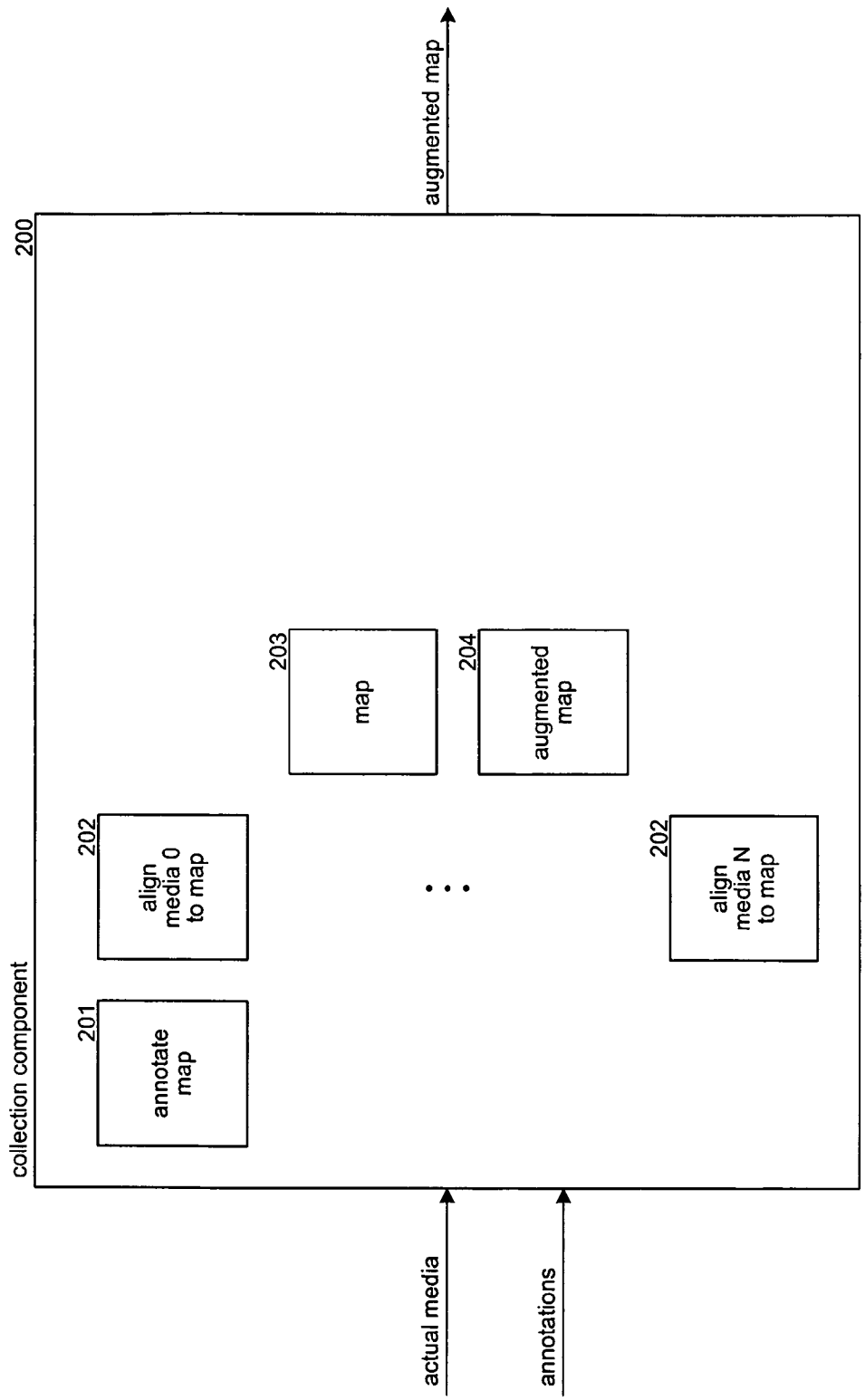
FIG. 2 is a block diagram that illustrates the sub-components of the collection component of the augmented navigation system in one embodiment.

FIG. 2 is a block diagram that illustrates the sub-components of the collection component of the augmented navigation system in one embodiment. The collection component 200 includes an annotate map component 201, align media to map components 202, a map store 203, and an augmented map store 204. The collection component receives the actual media and annotations. The collection component invokes the annotate map component to add the received annotations to the map at specified locations to form an augmented map. The collection component invokes the align media to map components to align the actual media to their corresponding map locations to generate the augmented map. Alternatively, the annotate map component may add annotations to the various media rather than to the map. For example, if the actual media is a video, then the annotate map component may add annotations to specific frames within the video. When the video is then aligned with the map, the annotation will be indirectly associated with a map location. The collection component outputs the augmented map to the direction component.

Figure 3:
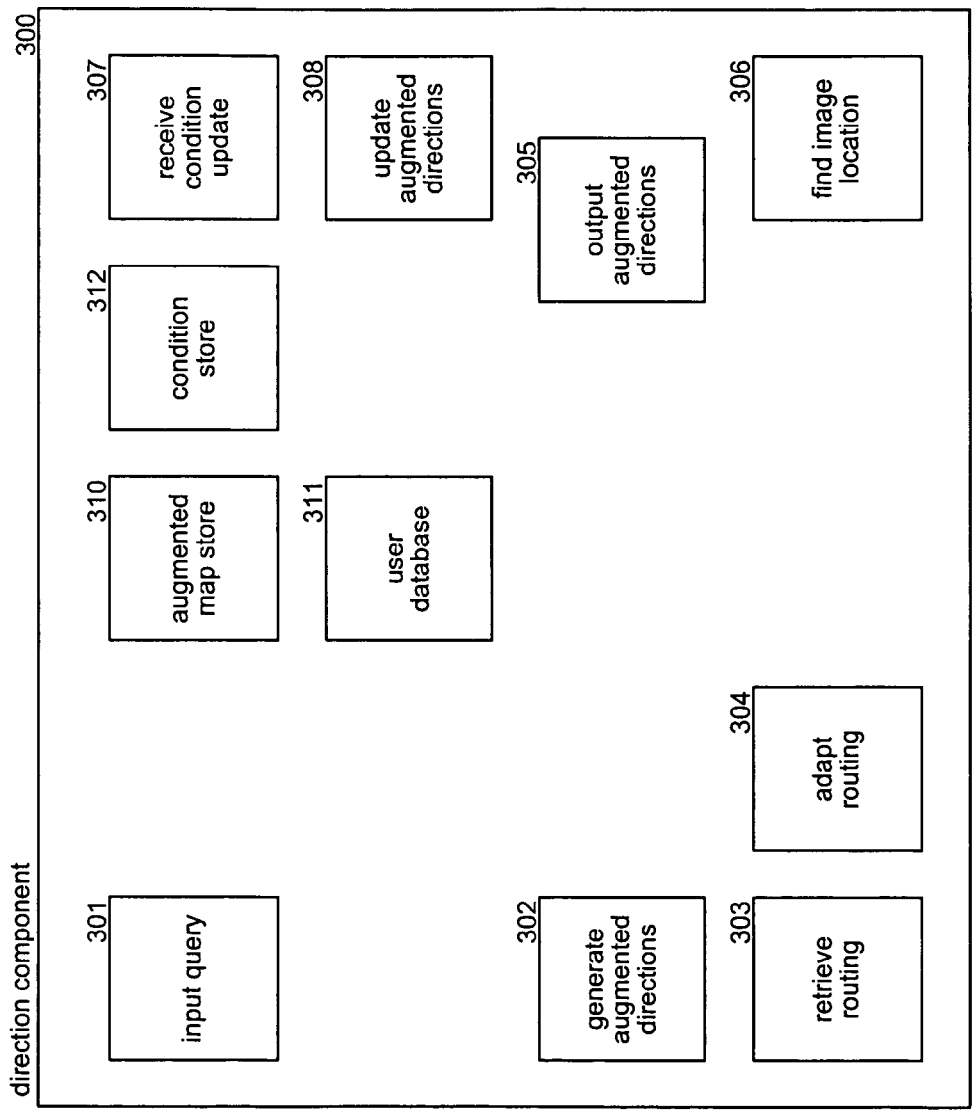
FIG. 3 is a block diagram that illustrates the sub-components of the direction component of the augmented navigation system in one embodiment.

FIG. 3 is a block diagram that illustrates the sub-components of the direction component of the augmented navigation system in one embodiment. The direction component includes an input query component 301, a generate augmented directions component 302, a retrieve routing component 303, an adapt routing component 304, an output augmented directions component 305, a find image location component 306, a receive condition update component 307, and an update augmented directions component 308. The direction component also includes an augmented map store 310, a user database 311, and a condition store 312. The direction component receives the augmented map from the collection component and stores it in the augmented map store. The input query component receives a query for directions and invokes the generate augmented directions component to generate the augmented directions. The generate augmented directions component invokes the retrieve routing component to retrieve the routing for the directions. The adapt routing component is invoked to adapt the retrieved routing to the user preferences (e.g., as indicated by the user database), playback constraints, and current conditions. If the augmented directions are not to be used in real time, then the adapt routing component may disregard some of the current conditions (e.g., current congestion) that may not be current at a later time. The output augmented directions component outputs the augmented directions to the query component. The find image location component receives an image and identifies the map location associated with that image. The receive condition update component receives updates to a condition (e.g., traffic congestion) and updates the condition store accordingly. The update augmented directions component is invoked when a condition changes and determines whether any augmented directions need to be updated.

Figure 4:
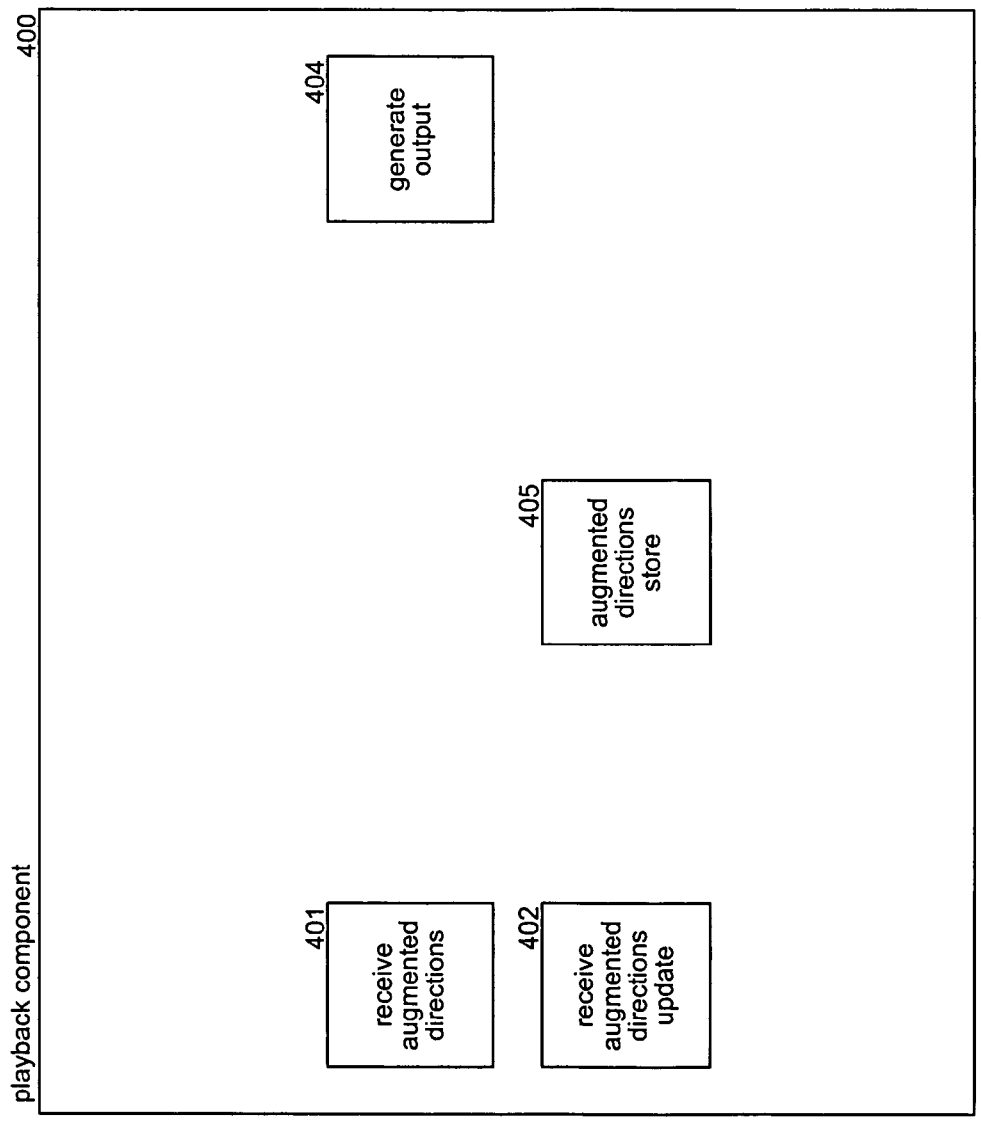
FIG. 4 is a block diagram that illustrates sub-components of the playback component of the augmented navigation system in one embodiment.

FIG. 4 is a block diagram that illustrates sub-components of the playback component of the augmented navigation system in one embodiment. The playback component includes a receive augmented directions component 401, a receive augmented directions update component 402, a generate output component 404, and an augmented directions store 405. The receive augmented directions component receives augmented directions from the query component and stores the augmented directions in the augmented directions store. The receive augmented directions update component receives updates to the augmented directions and stores them in the augmented directions store. The generate output component outputs the augmented directions of the augmented directions store based on user input or current location of the playback component.

Figure 5:
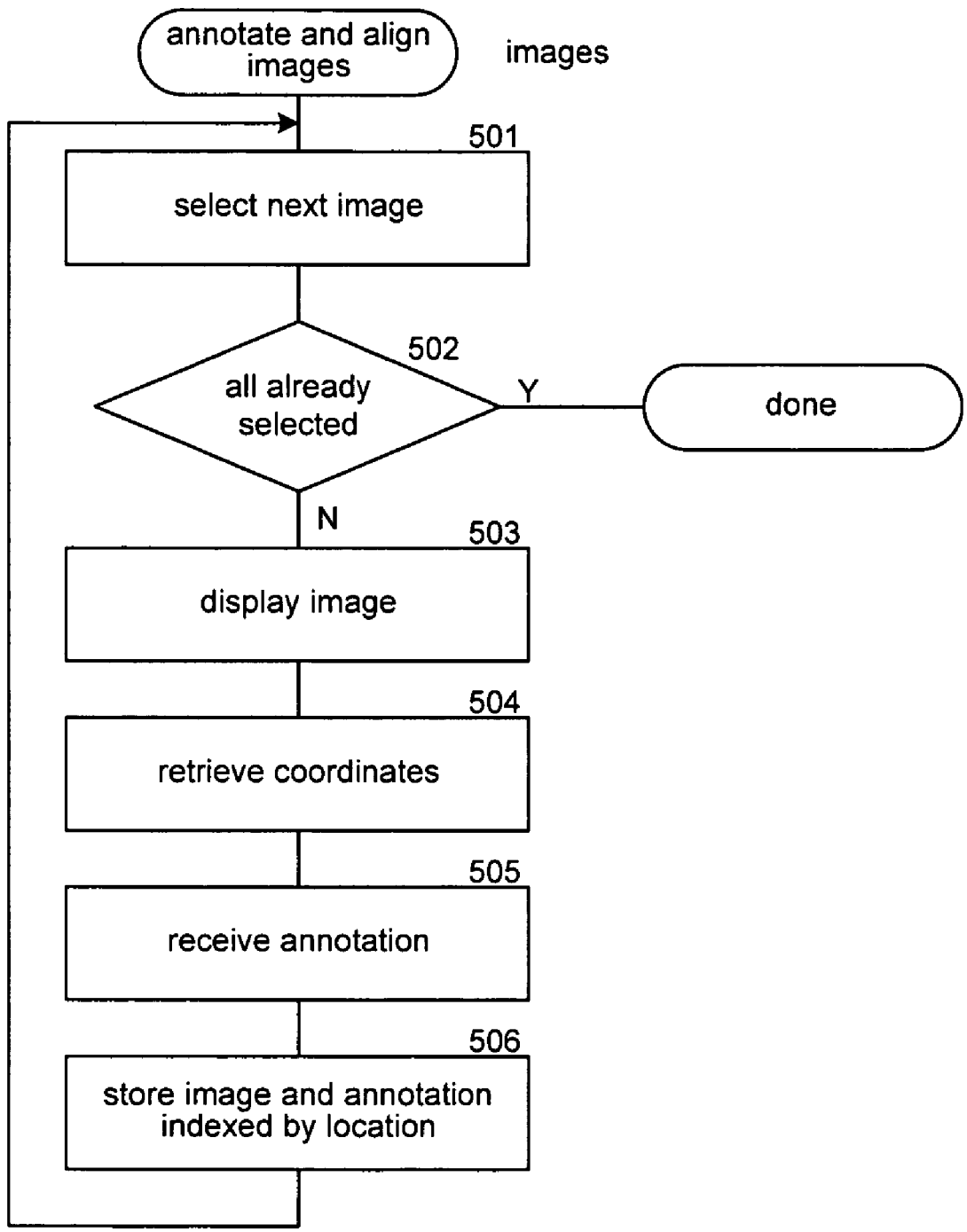
FIG. 5 is a flow diagram that illustrates the processing of an annotate and align images component of the augmented navigation system in one embodiment.

FIG. 5 is a flow diagram that illustrates the processing of an annotate and align images component of the augmented navigation system in one embodiment. The component is passed images and annotates the images and aligns them to the augmented map. In block 501, the component selects the next image. In decision block 502, if all the images have already been selected, then the component completes, else the component continues at block 503. In block 503, the component displays the selected image to the user. In block 504, the component retrieves the actual location for the selected image. The actual location may be provided when the image was collected (e.g., a GPS associated with the capture device) or may be provided by the user. In block 505, the component receives the annotation from the user. The annotation may be any form of media content including text, audio, video, animation, and so on. In block 506, the component stores the image and annotation indexed by the actual location and then loops to block 501 to select the next image.

Figure 6:
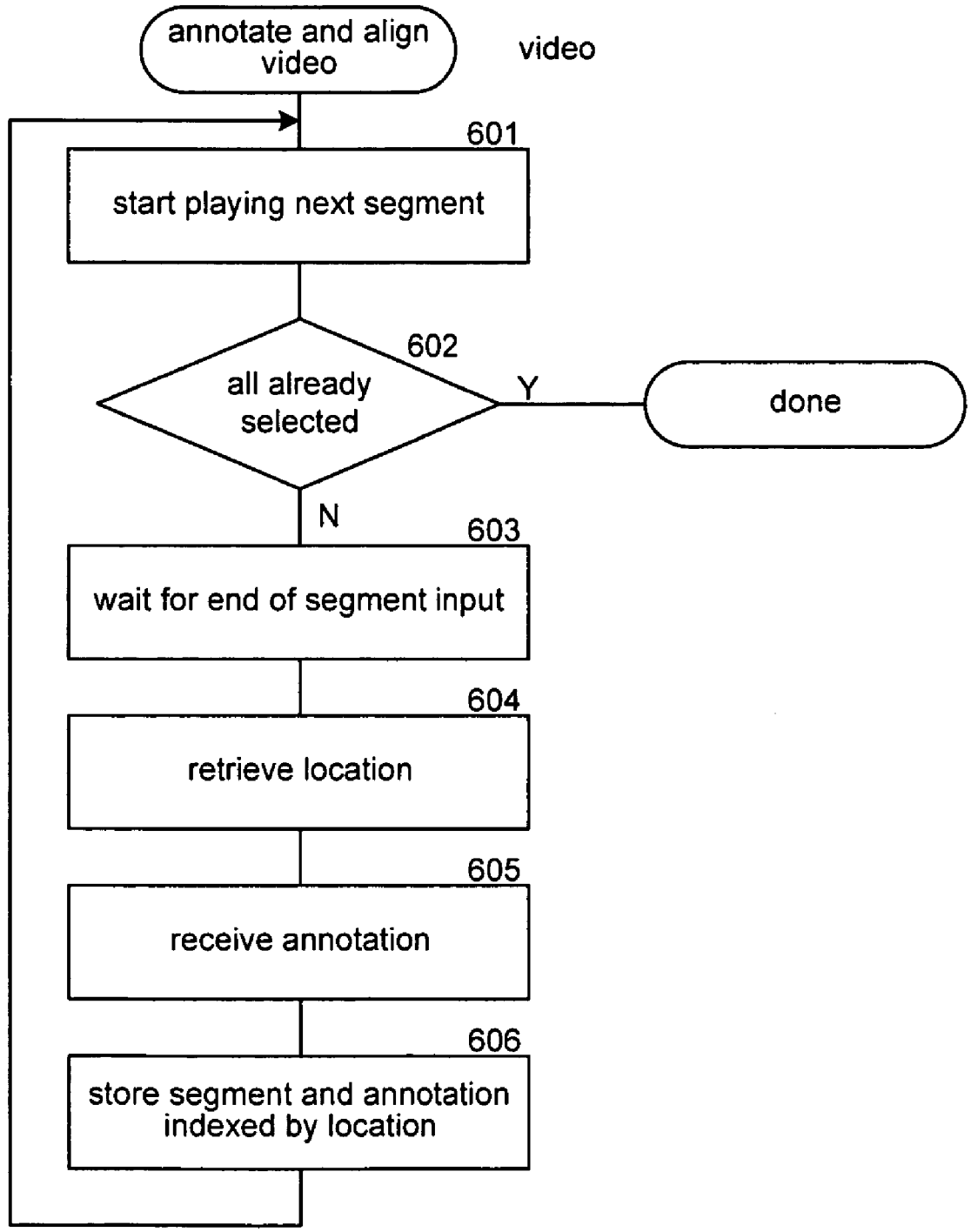
FIG. 6 is a flow diagram that illustrates the processing of an annotate and align video component of the augmented navigation system in one embodiment.

FIG. 6 is a flow diagram that illustrates the processing of an annotate and align video component of the augmented navigation system in one embodiment. The component is passed a video and annotates and aligns the video to the augmented map. In block 601, the component starts playing the next segment of the video. In decision block 602, if all the segments of the video have already been played, then the component completes, else the component continues at block 603. In block 603, the component waits for an end of segment input from the user. The user views the video and indicates the end of the segment such as when a video taken from a vehicle shows the end of a block. In block 604, the component retrieves the actual location for the segment. In block 605, the component receives the annotation from the user. In block 606, the component stores the segment and the annotation indexed by the actual location. The component then loops to block 601 to start playing the next segment.

Figure 7:
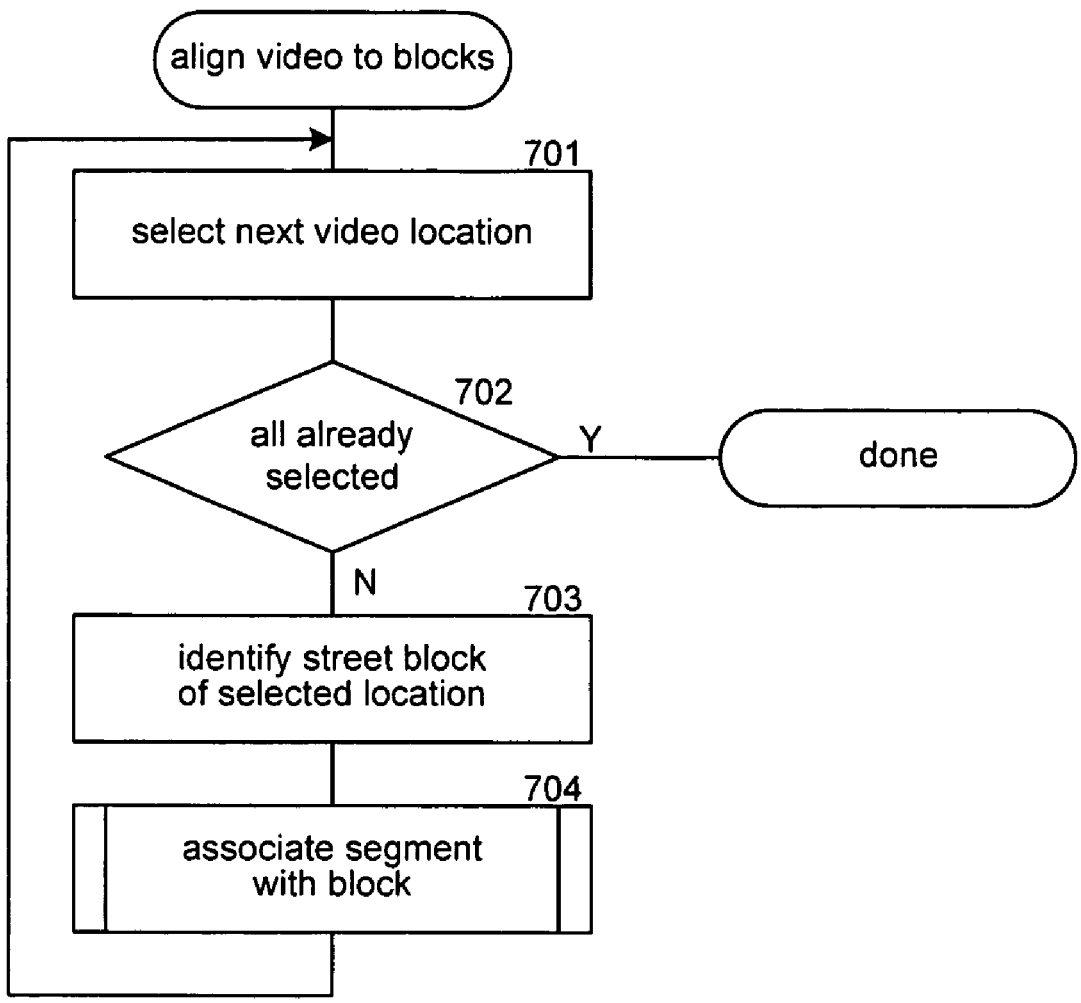
FIG. 7 is a flow diagram that illustrates the processing of an align video to blocks component of the augmented navigation system in one embodiment.

FIG. 7 is a flow diagram that illustrates the processing of an align video to blocks component of the augmented navigation system in one embodiment. The component automatically aligns a video to blocks based on actual locations collected when the video was collected and the locations of the blocks. The video collection device may include a GPS that automatically stores the actual location as the video is being collected. In block 701, the component selects the next video location. In decision block 702, if all the video locations have already been selected, then the component completes, else the component continues at block 703. In block 703, the component identifies a block corresponding to the selected video location. The un-augmented map may include actual locations that delimit each block represented on the map. In block 704, the component invokes a component to associate a video segment with the identified block. The component then loops to block 701 to select the next video location.

Figure 8:
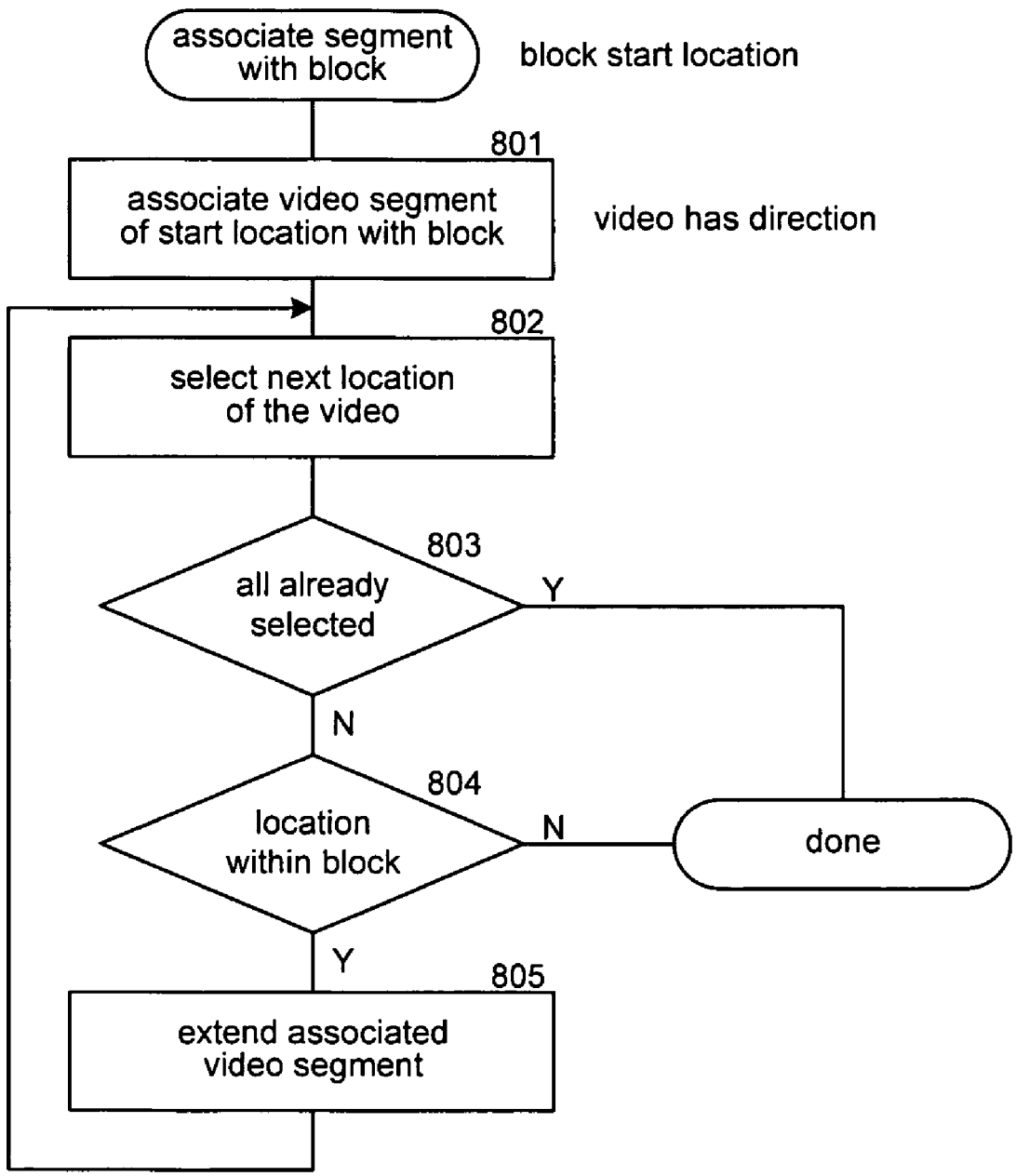
FIG. 8 is a flow diagram that illustrates the processing of an associate segment with block component of the augmented navigation system in one embodiment.

FIG. 8 is a flow diagram that illustrates the processing of an associate segment with block component of the augmented navigation system in one embodiment. The component is passed an indication of a block and a start location of a segment of the video. The component identifies the segment of the video that corresponds to the block. In block 801, the component associates the video segment with the start location of the block. In block 802, the component selects the next location of the video. In decision block 803, if all the locations of the video have already been selected, then the component completes, else the component continues at block 804. In decision block 804, if the selected location is within the block, then the component continues at block 805, else the component completes. In block 805, the component extends the video segment that is associated with the block and then loops to block 802 to select the next location of the video.

Figure 9:
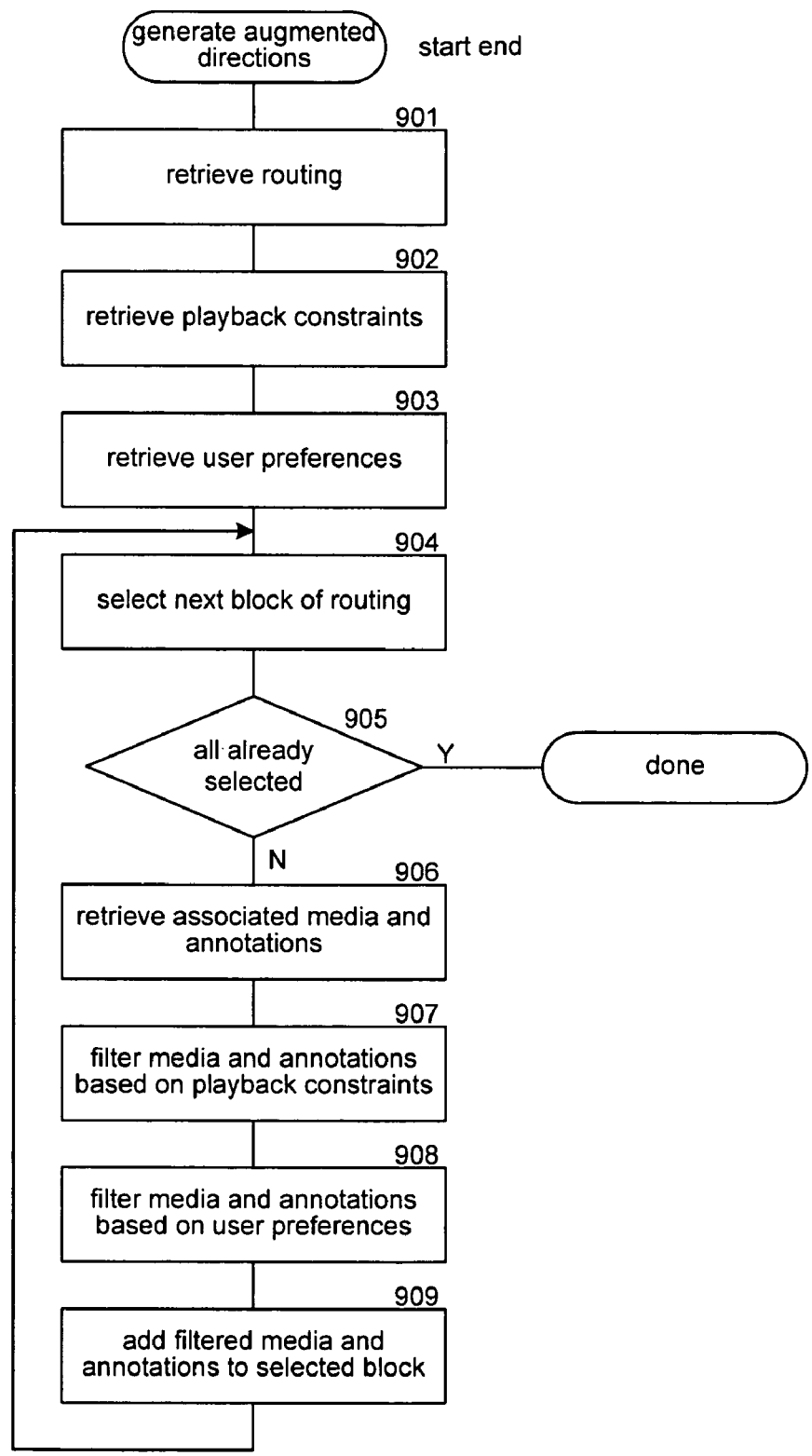
FIG. 9 is a flow diagram that illustrates the processing of a generate augmented directions component of the augmented navigation system in one embodiment.

FIG. 9 is a flow diagram that illustrates the processing of a generate augmented directions component of the augmented navigation system in one embodiment. The component is passed a query that includes a start location and an end location and generates augmented directions for traveling from the start location to the end location. In block 901, the component retrieves the routing for the directions. The routing may be generated using conventional techniques and may factor in user preferences (e.g., no toll roads) and conditions (e.g., a closed road). In block 902, the component retrieves constraints of the playback device (e.g., no audio output). In block 903, the component retrieves user preferences (e.g., no annotation). In blocks 904-909, the component loops augmenting the routing with annotations and actual media as indicated by the constraints and preferences. In block 904, the component selects the next block of the routing. In decision block 905, if all the blocks of the routing have already been selected, then the component completes, else the component continues at block 906. In block 906, the component retrieves the actual media and annotations associated with the selected block. In block 907, the component filters the actual media and annotations based on the playback constraints. In block 908, the component filters the actual media and annotations based on the user preferences. In block 909, the component adds the filtered actual media and annotations to the selected block to augment the selected block and then loops to block 904 to select the next block of the routing.

Figure 10:
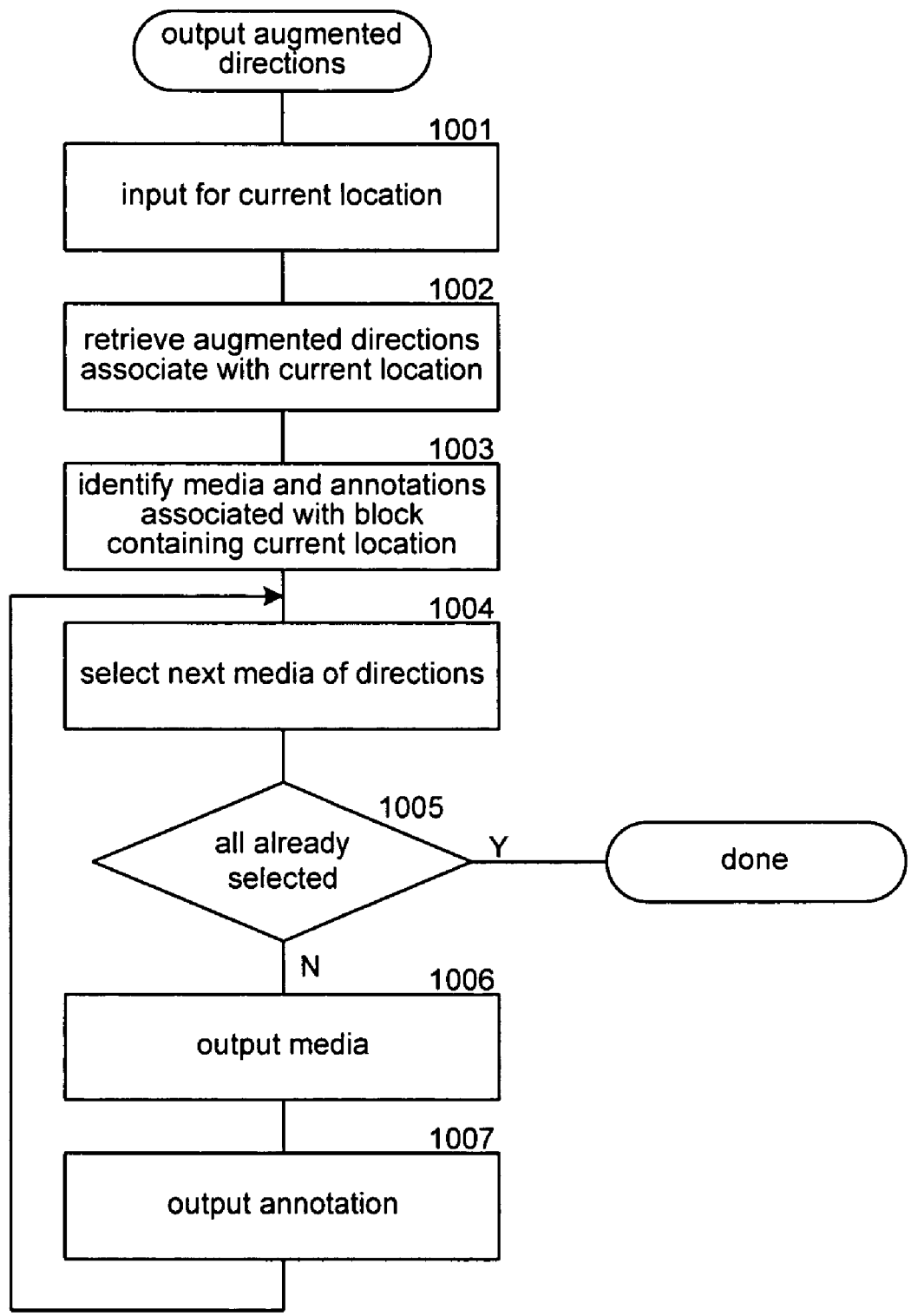
FIG. 10 is a flow diagram that illustrates the processing of an output augmented directions component of the augmented navigation system in one embodiment.

FIG. 10 is a flow diagram that illustrates the processing of an output augmented directions component of the augmented navigation system in one embodiment. The component is passed augmented directions and outputs the augmented directions based on current location as indicated by a GPS. In block 1001, the component inputs the current location from the GPS. In block 1002, the component retrieves the augmented directions associated with the current location. In block 1003, the component identifies the actual media and annotations associated with a block containing the current location. In blocks 1004-1007, the component loops outputting the identified actual media and annotations. In block 1004, the component selects the next identified actual media. In decision block 1005, if all the actual media has already been selected, then the component completes, else the component continues at block 1006. In block 1006, the component outputs the selected actual media. In block 1007, the component outputs the associated annotation. The component then loops to block 1004 to select the next actual media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the augmented navigation system may use a text-to-speech component to convert text instructions to oral instructions. The augmented navigation system may also identify the current location based on a verbal description provided by the user. For example, the user may input the verbal description "a library to my right," and the augmented navigation system may compare the verbal description to the annotations associated with augmented directions to determine the current location of the user. As another example, the user may input a handwritten drawing of a landmark, and the augmented navigation system may attempt to identify a matching image that is associated with a location. The playback device constraints may also specify the resolution associated with the playback device. In one embodiment, the actual media for the augmented navigation system may be collected by people traveling around an area. For example, a video capture device equipped with a GPS may be mounted to a vehicle, such as a taxi, bus, or delivery vehicle, to collect the video along with the associated actual location as the vehicle travels throughout the area. Accordingly, the invention is not limited except as by the appended claims.

We claim:

1. A system for providing augmented directions while a vehicle is being driven from a start location to an end location, comprising:

a direction database that contains an augmented map having actual media collected from actual locations and having annotations, the actual media including a video associated with actual locations within the augmented map, the video for an actual location including a capture speed indicating capture speed of a capture device at time of capture of the video, the annotations representing comments made by a person as directional assistance;

a direction component that inputs a start and an end location and a user preference for a user relating to possible routes, generates initial augmented directions for a route between the start and the end location that include actual media and annotations, the actual media including video associated with locations along the route, the route between the start and the end location being different depending on the user preference of the user and current conditions along routes from the start location to the end location, and generates revised augmented directions for a different route between the start location and the end location factoring in current conditions along routes from the start location to the end location and a current location of a vehicle traveling from the start location to the end location;

an output component that provides the initial and revised augmented directions to a playback device; and a mobile playback device that receives initial and revised augmented directions from the output component and plays back the augmented directions as the vehicle with the mobile playback device travels from the start location to the end location, the playing back of the augmented directions including outputting the annotations as directional assistance and playing the video associated with a current location of the vehicle at an adjusted playback rate to compensate for differences between travel speed of the vehicle and capture speed of the capture device so that the user can view on the video scenes from the current actual location of the vehicle, the current location of the vehicle being automatically determined using a device within the vehicle and provided to the direction component for generating revised augmented directions.

2. The system of claim 1 wherein the actual media include images collected from various actual locations.

3. The system of claim 1 wherein the direction component adapts the augmented directions based on constraints of the playback device.

4. The system of claim 1 including a query component that receives start and end locations and requests the direction component to provide directions for the start location to the end location.

5. The system of claim 1 wherein the current conditions are selected from a group consisting of traffic conditions, weather conditions, and road maintenance conditions.

6. The system of claim 1 wherein the direction database is generated from actual media collected at various locations.

7. A system for augmenting direction information with actual media, the directional information for assistance in a vehicle traveling from a start location to an end location, the system comprising:
    a map store,
    a collection component that receives actual media having an actual location, the actual media including a video captured at a capture location by a capture device traveling at a capture speed, the capture location of a video being automatically determined by a device traveling with the capture device;
    a media association component that associates actual media including video with the map based on a correspondence between actual locations and map locations;
    a directions component that inputs a start and an end location;
        generates initial augmented directions for an initial route between the start and the end location that include actual media and annotations, the actual media including video associated with locations along the route, the route between the start and the end location being different depending on current conditions along routes from the start location to the end location, and
        generates revised augmented directions for a different route between a current location of the vehicle and the end location factoring in current conditions along routes from the current location to the end location; and
    a mobile playback device that receives initial and revised augmented directions and plays back the augmented directions as the vehicle with the mobile playback device travels from the start location to the end location, the playing back of the augmented directions including playing the video associated with a current location of the vehicle at an adjusted playback rate to compensate for differences between travel speed of the vehicle and capture speed of the capture device so that the user can view on the video scenes from the current actual location of the vehicle, the current location of the vehicle being automatically determined using a device within the vehicle and provided to the direction component for generating revised augmented directions.

8. The system of claim 7 including an annotation association component that inputs annotations and associates the annotations with map locations.

9. The system of claim 7 wherein the media association component automatically associates the actual media based on actual locations collected when the actual media were collected.

10. The system of claim 7 wherein the received actual media was collected with a device that also collected the actual location of the device when the media was collected.

11. A system for outputting augmented directions, the system comprising:
    a collection component that receives actual media having an actual location, the actual media including a video captured at a capture location by a capture device traveling at a capture speed, the capture location of a video being automatically determined by a device traveling with the capture device; and
    a media association component that associates actual media including video with a map based on a correspondence between actual locations and map locations;
    a directions component that inputs a start and an end location; and
        generates initial augmented directions for an initial route between the start and the end location that include actual media and annotations, the actual media including video associated with locations alona the route; and
    an augmented direction store that contains augmented directions generated by the directions component that include actual media and annotations;
    an output component that outputs the augmented directions along with the actual media and the annotations;
    a mobile playback device that receives augmented directions and plays back the augmented directions as a vehicle with the mobile playback device travels from the start location to the end location, the playing back of the augmented directions including playing the video associated with a current location of the vehicle at an adjusted playback rate to compensate for differences between travel speed of the vehicle and capture speed of the capture device so that the user can view on the video scenes from the current actual location of the vehicle.

12. The system of claim 11 including a location component that determines a current location and wherein the output component outputs the augmented directions along with the actual media and the annotation based on the current location.

13. The system of claim 1 including an update component that updates the augmented directions of the augmented direction store based on changing current conditions.

* * * * *

UNITED STATES PATENT AND TRADEMARK OFFICE
CERTIFICATE OF CORRECTION

| | | |
|---|---|---|
| PATENT NO. | : 7,509,215 B2 | Page 1 of 1 |
| APPLICATION NO. | : 11/301334 | |
| DATED | : March 24, 2009 | |
| INVENTOR(S) | : Guo Bin Shen et al. | |

It is certified that error appears in the above-identified patent and that said Letters Patent is hereby corrected as shown below:

In column 9, line 23, in Claim 7, delete "store," and insert -- store; --, therefor.

In column 10, line 31, in Claim 11, delete "alona" and insert -- along --, therefor.

In column 10, line 37, in Claim 11, after "annotations;" insert -- and --.

In column 10, line 52, in Claim 13, delete "claim 1" and insert -- claim 11--, therefor.

Signed and Sealed this
Third Day of May, 2011

David J. Kappos
*Director of the United States Patent and Trademark Office*